United States Patent
Ding et al.

(10) Patent No.: US 10,138,159 B2
(45) Date of Patent: *Nov. 27, 2018

(54) COATED ARTICLE HAVING LOW-E COATING WITH IR REFLECTING LAYER(S) AND HIGH INDEX NITRIDED DIELECTRIC FILM HAVING MULTIPLE LAYERS

(71) Applicant: Guardian Industries Corp., Auburn Hills, MI (US)

(72) Inventors: Guowen Ding, San Jose, CA (US); Daniel Schweigert, San Jose, CA (US); Minh Le, San Jose, CA (US); Brent Boyce, Novi, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/453,944

(22) Filed: Mar. 9, 2017

(65) Prior Publication Data
US 2018/0259695 A1 Sep. 13, 2018

(51) Int. Cl.
*C03C 17/36* (2006.01)
*B32B 15/04* (2006.01)
*B32B 17/06* (2006.01)

(52) U.S. Cl.
CPC ................ *C03C 17/3615* (2013.01)

(58) Field of Classification Search
USPC ....... 428/426, 428, 432, 434, 688, 697, 701, 428/702
See application file for complete search history.

(56) References Cited

U.S. PATENT DOCUMENTS

| 4,883,721 A | 11/1989 | Nalepka et al. |
| 5,110,637 A * | 5/1992 | Ando ............... C03C 17/23 428/34 |
| 5,344,718 A | 9/1994 | Hartig et al. |

(Continued)

FOREIGN PATENT DOCUMENTS

| EP | 0 560 534 | 9/1993 |
| EP | 2 746 236 | 6/2014 |
| FR | 3 038 597 | 1/2017 |

OTHER PUBLICATIONS

U.S. Appl. No. 15/448,620, filed Mar. 3, 2017; Saraf et al.
(Continued)

*Primary Examiner* — Lauren R Colgan
(74) *Attorney, Agent, or Firm* — Nixon & Vanderhye P.C.

(57) ABSTRACT

A coated article includes a low emissivity (low-E) coating having at least one infrared (IR) reflecting layer of a material such as silver, gold, or the like, and at least one high refractive index dielectric multilayer film. The high index dielectric multilayer film may be of or include a first high index layer of or including ZrSiN and/or ZrSiAlN, and a second high index layer of or including titanium oxide (e.g., $TiO_2$). The first high index layer of or including ZrSiN and/or ZrSiAlN may be amorphous or substantially amorphous, and the second high index layer of or including titanium oxide may be substantially crystalline in certain example embodiments. The low-E coating may be used in applications such as monolithic or insulating glass (IG) window units, vehicle windows, or the like.

28 Claims, 2 Drawing Sheets

(56) References Cited

U.S. PATENT DOCUMENTS

| | | |
|---|---|---|
| 6,210,784 B1 | 4/2001 | Rondeau et al. |
| 6,291,867 B1 * | 9/2001 | Wallace ............ H01L 21/28185 257/310 |
| 6,355,334 B1 | 3/2002 | Rondeau et al. |
| 6,576,349 B2 | 6/2003 | Lingle et al. |
| 6,589,658 B1 * | 7/2003 | Stachowiak ............ C03C 17/36 428/426 |
| 6,602,608 B2 | 8/2003 | Stachowiak |
| 6,610,410 B2 | 8/2003 | Ebisawa et al. |
| 6,830,817 B2 * | 12/2004 | Stachowiak ............ C03C 17/36 428/426 |
| 7,005,188 B2 | 2/2006 | Anderson et al. |
| 7,081,301 B2 | 7/2006 | Stachowiak |
| 7,153,578 B2 * | 12/2006 | Chonlamaitri .......... C03C 17/36 428/428 |
| 7,153,579 B2 | 12/2006 | Kriltz et al. |
| 7,241,506 B2 | 7/2007 | Hartig |
| 7,390,572 B2 * | 6/2008 | Butz ....................... C03C 17/36 428/428 |
| 7,846,492 B2 * | 12/2010 | Veerasamy ............. C03C 17/34 427/162 |
| 7,892,662 B2 * | 2/2011 | Veerasamy ............. C03C 17/36 428/432 |
| 8,105,695 B2 * | 1/2012 | Depauw ................. C03C 17/36 428/432 |
| 8,557,391 B2 * | 10/2013 | Frank ..................... C03C 17/36 428/434 |
| 8,940,400 B1 * | 1/2015 | Wuillaume ............ C03C 17/36 428/426 |
| 8,945,714 B2 | 2/2015 | Lao et al. |
| 9,028,956 B2 | 5/2015 | Knoll et al. |
| 9,028,983 B2 | 5/2015 | Imran et al. |
| 9,052,456 B2 | 6/2015 | Hassan et al. |
| 9,150,003 B2 * | 10/2015 | Dietrich .................... B32B 5/00 |
| 9,199,874 B2 | 12/2015 | Peter et al. |
| 9,212,417 B2 | 12/2015 | Frank et al. |
| 9,297,197 B2 | 3/2016 | Lao et al. |
| 9,309,149 B2 * | 4/2016 | Ding .................. C03C 17/3639 |
| 9,315,414 B2 | 4/2016 | Hassan et al. |
| 9,365,450 B2 | 6/2016 | Ding et al. |
| 9,371,684 B2 | 6/2016 | Butz et al. |
| 9,403,345 B2 | 8/2016 | Lao et al. |
| 9,410,359 B2 | 8/2016 | Ding et al. |
| 9,494,717 B2 | 11/2016 | Reymond et al. |
| 9,499,437 B2 | 11/2016 | Imran et al. |
| 9,518,319 B2 | 12/2016 | Ding et al. |
| 9,556,070 B2 | 1/2017 | Wuillaume et al. |
| 9,738,561 B2 * | 8/2017 | Butz ........................ C03C 17/36 |
| 9,816,316 B2 * | 11/2017 | Lao ........................ C03C 17/36 |
| 2006/0121290 A1 | 6/2006 | Chonlamaitri et al. |
| 2007/0281171 A1 * | 12/2007 | Coster ............... B32B 17/10036 428/432 |
| 2010/0279144 A1 * | 11/2010 | Frank ..................... C03C 17/36 428/623 |
| 2015/0118465 A1 | 4/2015 | Wuillaume et al. |
| 2015/0140354 A1 | 5/2015 | Pallotta et al. |
| 2016/0031750 A1 * | 2/2016 | Ridealgh ............. C03C 17/3435 428/336 |

OTHER PUBLICATIONS

U.S. Appl. No. 15/448,629, filed Mar. 3, 2017; Ding et al.
U.S. Appl. No. 15/448,739, filed Mar. 3, 2017; Zhang et al.
PCT International Search Report dated Jun. 19, 2018 for PCT/US2018/021441.

* cited by examiner

| | CE 1 | Ex. 1 | Ex. 2 | Ex. 3 | Ex. 4 | Ex. 5 | CE 2 |
|---|---|---|---|---|---|---|---|
| SiO2 | 30 | 30 | 30 | 30 | 30 | 30 | 30 |
| Si3N4 | 17.7 | 18.0 | 19.2 | 19.0 | 18.1 | 17.9 | 17.3 |
| ZrSiN | 9.5 | 10.0 | 5.1 | 0.0 | 0.0 | 0.0 | 0.0 |
| TiO2 | 4 | 4 | 8 | 13 | 13.84 | 14.6 | 15.0 |
| NiTiNbOx | 2.6 | 2.6 | 2.6 | 2.6 | 2.6 | 2.6 | 2.6 |
| Ag | 11 | 11 | 11 | 11 | 11 | 11 | 11 |
| ZnO | 4 | 4 | 4 | 4 | 4 | 4 | 4 |
| TiO2 | 0 | 4 | 8 | 13 | 18 | 23 | 27.1 |
| ZrSiN | 29.2 | 24.7 | 20.1 | 14.3 | 8.0 | 1.1 | 0.0 |
| Si3N4 | 7.9 | 8.9 | 9.7 | 9.7 | 10.5 | 12.9 | 7.5 |
| glass | | | | | | | |
| base layer deposition time | 17.8 | 29.3 | 40.6 | 54.3 | 68.2 | 82.4 | 93.4 |
| DDR_ZrSiN | 526% | 319% | 230% | 172% | 137% | 113% | 100% |
| SHGC % | 55.2 | 55.4 | 55.7 | 56 | 56.1 | 56.2 | 56.2 |

Fig. 2

COATED ARTICLE HAVING LOW-E COATING WITH IR REFLECTING LAYER(S) AND HIGH INDEX NITRIDED DIELECTRIC FILM HAVING MULTIPLE LAYERS

Example embodiments of this invention relate to a coated article including a low emissivity (low-E) coating having at least one infrared (IR) reflecting layer of a material such as silver, gold, or the like, and at least one high refractive index dielectric bi-layer film. The high index dielectric bi-layer film may be of or include a first high index layer of or including ZrSiN and/or ZrSiAlN, and a second high index layer of or including titanium oxide (e.g., $TiO_2$). The first high index layer of or including ZrSiN and/or ZrSiAlN may be amorphous or substantially amorphous, and the second high index layer of or including titanium oxide may be substantially crystalline in certain example embodiments, with the amorphous aspect helping the low-E coating to better withstand optional heat treatment (HT) such as thermal tempering. In certain example embodiments, the low-E coating may be used in applications such as monolithic or insulating glass (IG) window unit, vehicle windows, of the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like.

Conventional low-E coatings are disclosed, for example and without limitation, in U.S. Pat. Nos. 6,576,349, 9,212,417, 9,297,197, 7,390,572, 7,153,579, and 9,403,345, the disclosures of which are hereby incorporated herein by reference.

Certain low-E coating utilize at least one transparent dielectric layer of titanium oxide (e.g., $TiO_2$), which has a high refractive index (n), for antireflection and/or coloration purposes. See for example U.S. Pat. Nos. 9,212,417, 9,297,197, 7,390,572, 7,153,579, and 9,403,345. Although high refractive index dielectric material $TiO_2$ is known and used in low-E coatings, $TiO_2$ has a very low sputter-deposition rate and is not thermally stable upon heat treatment such as thermal tempering of about 650 C for 8 minutes, due to film crystallization (or change in crystallinity) in as-deposited or post-tempering state, which may in turn induce thermal or lattice stress on adjacent layers in the film stack. Such stress can further cause change in physical or material properties of the stack and hence impact on the Ag layer, which results in deteriorated low E stack performance. The low sputter deposition rate of $TiO_2$ leads to significantly high costs associated with making low-E coatings including such layer(s).

Example embodiments of this invention solve these problems by providing a high index (high refractive index value n, measured at 550 nm) and low absorption (low k value, measured at 400 nm) multilayer film in a low-E coating, wherein the overall high index multilayer film has a higher sputter deposition rate than solely $TiO_2$ of like thickness, the overall high index multilayer film has improved thermal stability compared to $TiO_2$ of like thickness, and use of the overall high index multilayer film does not significantly adversely affect optical performance of the low-E coating compared to use of $TiO_2$ of like thickness. Example embodiments of this invention relate to a coated article including a low emissivity (low-E) coating having at least one infrared (IR) reflecting layer of a material such as silver, gold, or the like, and at least one high refractive index dielectric bi-layer film. The high index dielectric bi-layer film may be of or include a first high index layer of or including ZrSiN and/or ZrSiAlN, and a second high index layer of or including titanium oxide (e.g., $TiO_2$), which has been found to improve deposition rate of the coating and also improve/raise solar heat gain properties of the coated article in monolithic or IG applications. The first high index layer of or including ZrSiN and/or ZrSiAlN may be amorphous or substantially amorphous, and the second high index layer of or including titanium oxide may be substantially crystalline in certain example embodiments, with the amorphous aspect helping the low-E coating to better withstand optional heat treatment (HT) such as thermal tempering. The high index dielectric bi-layer film has a faster sputtering rate than $TiO_2$ at like thickness, as the ZrSiN and/or ZrSiAlN portion of the bi-layer film has a significantly faster sputter deposition rate than $TiO_2$, thereby leading to lower costs associated with producing low-E coatings. The high index bi-layer film may be a transparent dielectric high index layer in preferred embodiments, which may be provided for antireflection purposes and/or color adjustment purposes, in addition to having thermal stability. In certain example embodiments, the low-E coating may be used in applications such as monolithic or insulating glass (IG) window unit, vehicle windows, of the like.

In an example embodiment of this invention, there is provided a coated article including a coating supported by a glass substrate, the coating comprising: a first dielectric film on the glass substrate; an infrared (IR) reflecting layer on the glass substrate, located over at least the first dielectric film; a second dielectric film on the glass substrate, located over at least the IR reflecting layer; and wherein at least one of the first and second dielectric films comprises (a) a first high index dielectric layer comprising a nitride of Zr and Si, wherein the first high index dielectric layer contains more Zr than Si, and (b) a second high index dielectric layer comprising an oxide of titanium that directly contacts the first high index dielectric layer.

BRIEF DESCRIPTION OF THE DRAWINGS

FIG. 2 is a chart setting forth layer stacks with thicknesses in units of nm, deposition rates, and SHGC values for Comparative Examples 1-2 (CEs 1-2) and Examples 1-5.

DETAILED DESCRIPTION OF EXAMPLE EMBODIMENTS OF THE INVENTION

Figure 1:
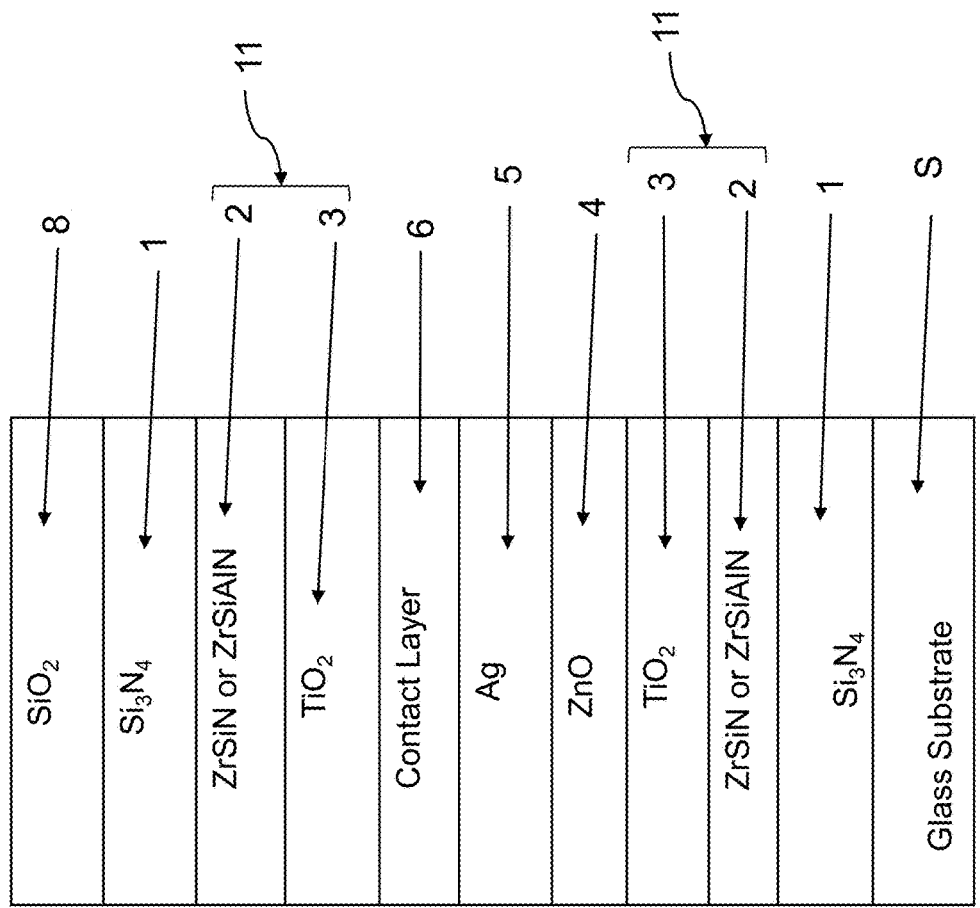
FIG. 1 is a cross sectional view of a coated article according to an example embodiment of this invention.

Referring now to the drawings in which like reference numerals indicate like parts throughout the several views.

Coated articles herein may be used in applications such as monolithic windows, IG window units such as residential windows, patio doors, vehicle windows, and/or any other suitable application that includes single or multiple substrates such as glass substrates.

Example embodiments of this invention provide at least one high index (high refractive index value n, measured at 550 nm) and low absorption (low k value, measured at 400 nm) multilayer film 11 in a low-E coating, wherein the overall high index multilayer film 11 has a higher sputter deposition rate than solely $TiO_2$ of like thickness. The overall high index multilayer film 11 has improved thermal stability compared to $TiO_2$ of like thickness, and use of the overall high index multilayer film 11 does not significantly adversely affect optical performance of the low-E coating compared to use of $TiO_2$ of like thickness. Example embodiments of this invention relate to a coated article including a low emissivity (low-E) coating having at least one infrared (IR) reflecting layer of a material such as silver, gold, or the like, and at least one such high index multilayer film 11. The multi-layer film 11 may be made up of two or more high index layers in certain example embodiments of this invention, and may be a bi-layer film. For example, the high index dielectric bi-layer films 11 shown in FIG. 1 may each be of or include a first high index layer of or including ZrSiN and/or ZrSiAlN (in various stoichiometries) 2, and a second high index layer of or including titanium oxide (e.g., $TiO_2$) 3. The first high index layer of or including ZrSiN and/or ZrSiAlN 2 may be amorphous or substantially amorphous, and the second high index layer of or including titanium oxide 3 may be substantially crystalline in certain example embodiments, with the amorphous aspect helping the low-E coating to better withstand optional heat treatment (HT) such as thermal tempering. The high index dielectric bi-layer film 11 has a faster sputtering rate than $TiO_2$ at like thickness, as the ZrSiN and/or ZrSiAlN portion 2 of the bi-layer film 11 has a significantly faster sputter deposition rate than $TiO_2$, thereby leading to lower costs associated with producing low-E coatings. The high index film 11 may be a transparent dielectric high index layer in preferred embodiments, which may be provided for antireflection purposes and/or color adjustment purposes, in addition to having thermal stability. In certain example embodiments, the low-E coating may be used in applications such as monolithic or insulating glass (IG) window unit, vehicle windows, of the like.

The chemical representations herein where Zr is included are provided for purposes of simplicity and understanding, and are not necessarily stoichiometric. For example, ZrSiN does not mean that equal amounts of Zr, Si and N are provided. As another example, ZrSiAlN does not mean that equal amounts of Zr, Si, Al and N are provided. Instead, for example and without limitation, a ZrSiN layer may include more Zr than Si, and so forth. As another example, a ZrSiAlN layer may contain more Zr than Si, and more Cr than Al.

"Heat treatment" (HT) and like terms such as "heat treating" and "heat treated", such as thermal tempering, heat strengthening, and/or heat bending, as used herein means heat treating the glass substrate and coating thereon at temperature of at least 580 degrees C. for at least 5 minutes. An example heat treatment is heat treating at temperature of about 600-650 degrees C. for at least 8 minutes.

"Film" as used herein means one or more layers. Thus, in the FIG. 1 embodiment for example, there is a dielectric film below the IR reflecting layer 5 made up of one, two, three, or all four of layers 1, 2, 3, 4. High index multi-layer films 11 in the FIG. 1 example embodiment each include two layers 2, 3, although they may include more films in other example embodiments.

It has been found that adding Zr to SiAlN and SiN allows widening of its band-gap, and thus lowers considerably the optical absorption (k) while increasing refractive index (n). These materials have also been found to be heat stable (e.g., the variation of refractive index n may be low due to HT such as thermal tempering at about 650° C.). Thus, the addition of Zr to SiAlN and SiN provides for an improvement in the art because it causes the resulting layer to have a higher refractive index and lower absorption coefficient. In certain example embodiments of this invention, sufficient Zr is provided in layer(s) 2 of or including ZrSiN and/or ZrSiAlN so that layer(s) 2 has a high refractive index (n) of at least 2.21, more preferably of at least 2.25, even more preferably of at least 2.30 (at 550 nm).

An example metal content of a ZrSiAlN layer 2 is as following with respect to atomic ratio: Zr:Si:Al→62.6:31.3:6.7:30.7. In other words, Zr makes up 62.6%, Si makes up 6.7%, and Al makes up 30.7% of the metal content of the nitrided layer 2 in terms of atomic %. In certain example embodiments of this invention, metal content of the ZrSiN and/or ZrSiAlN dielectric layer(s) 2 may contain: (i) from 30-80% Zr, more preferably from 35-75% Zr, even more preferably from 55-70% Zr (atomic %); (ii) from 0-50% Si, more preferably from 3-25% Si, even more preferably from 3-15% Si (atomic %); and (iii) from 10-60% Al, more preferably from 15-50% Al, even more preferably from 20-40% Al, and most preferably from 25-36% Al (atomic %). Note that Si is considered a metal herein. In certain example embodiments, layer(s) 2 ontains more Zr than Si, and more Zr than Al in terms of atomic percentage. In certain example embodiments, Zr has the highest metal content of any metal in layer(s) 2, and/or Al has the second highest metal content of any metal in layer(s) 2. In certain example embodiments, layer 2 contains at least twice as much Zr as Si, more preferably at least three times as much Zr as Si, even more preferably at least four times as much Zr as Si, and most preferably at least five times as much Zr as Si (in terms of atomic %). In certain example embodiments, layer(s) contains at least 1.2 times as much Zr as Al, more preferably at least 1.4 times as much Zr as Al, and most preferably at least 1.7 times as much Zr as Al (in terms of atomic %). For example, when layer 2 contains 31% Al and 63% Zr, it contains 2.032 times as much Zr as Al (i.e., 63/31=2.032).

The metal content of the ZrSiN and/or ZrSiAlN dielectric layer(s) 2 is preferably free of, or substantially free of, Ti and/or Nb. Layer(s) 2 may contain from 0-10% of Ti, more preferably from 0-5% Ti, and most preferably from 0-2% of Ti (atomic %), and/or from 0-10% of Nb, more preferably from 0-5% Nb, and most preferably from 0-2% of Nb.

While oxygen is not preferred in high index ZrSiN and/or ZrSiAlN dielectric layers 2 discussed herein, it is possible that these layers may contain a small amount of oxygen, especially in view of crosstalk from the adjacent titanium oxide layer 3 also be sputter deposited. For example, high index ZrSiN and/or ZrSiAlN dielectric layers 2 may contain from 0-10% oxygen more preferably from 0-5% oxygen, and most preferably from 0-4% oxygen (atomic %).

High index dielectric layer 3 of or including titanium oxide (e.g., $TiO_2$) may or may not be doped with other elements in different embodiments of this invention. In preferred embodiments, Ti has the highest metal content (e.g., at least 70%, more preferably at least 80%, and most preferably at least 90 or 95%) of any metal in titanium oxide layers 3 discussed herein.

FIG. 1 is a cross sectional view of a coated article according to an example embodiment of this invention. The coated article includes glass substrate S (e.g., clear, green, bronze, or blue-green glass substrate from about 1.0 to 10.0 mm thick, more preferably from about 1.0 mm to 6.0 mm thick), and a multi-layer coating (or layer system) provided on the substrate S either directly or indirectly. The example low-E coating according to the FIG. 1 embodiment may include an optional medium index layer 2 of or including a material such as silicon nitride (e.g., $Si_3N_4$) and/or silicon oxynitride, a first high index multilayer dielectric film 11 below the IR reflecting layer and made up of a first high index dielectric layer 2 of or including ZrSiN and/or ZrSiAlN and a second high index dielectric layer 3 of or including titanium oxide (e.g., $TiO_2$), zinc oxide and/or zinc stannate inclusive contact layer 4 (e.g., $ZnO_x$ where "x" may be about 1; or ZnAlO$_x$), IR (infrared) reflecting layer 5 including or of silver, gold, or the like, upper contact layer 6 of or including an oxide of Ni and/or Cr (e.g., NiCrO$_x$) or other suitable material, a second high index multilayer dielectric film 11 over at least the IR reflecting layer 5 and made up of a first high index dielectric layer 2 of or including ZrSiN and/or ZrSiAlN and a second high index dielectric layer 3 of or including titanium oxide (e.g., TiO$_2$), another medium index layer 1 of or including a material such as silicon nitride (e.g., Si$_3$N$_4$) and/or silicon oxynitride over the second high index multiplayer film 11, and an overcoat 11 of or including a low index material such as silicon oxide (e.g., SiO$_2$). The silicon nitride layers 1 may further include Al, oxygen, or the like, and the zinc oxide based layer 4 may also include tin and/or aluminum. Other layers and/or materials may also be provided in the coating in certain example embodiments of this invention, and it is also possible that certain layers may be removed or split in certain example instances. Moreover, one or more of the layers discussed above may be doped with other materials in certain example embodiments of this invention. This invention is not limited to the layer stack shown in FIG. 1, as the FIG. 1 stack is provided for purposes of example only in order to illustrate an example location(s) for high index films 11. While the FIG. 1 embodiment contains two high index multilayer films 11, this invention is not so limited and either one of the films 11 in the FIG. 1 embodiment may be omitted in certain alternative embodiments of this invention. As another example modification, and consistent with Examples 3-5 herein, the Zr inclusive dielectric layer 2 may be omitted from the upper high index film 11, leaving titanium oxide to make up the high index layer in the upper portion of the layer stack.

In monolithic instances, the coated article includes only one substrate such as glass substrate S (see FIG. 1). However, monolithic coated articles herein may be used in devices such as IG window units for example. Typically, an IG window unit may include two or more spaced apart substrates with an air gap defined therebetween. Example IG window units are illustrated and described, for example, in U.S. Pat. Nos. 5,770,321, 5,800,933, 6,524,714, 6,541,084 and US 2003/0150711, the disclosures of which are all hereby incorporated herein by reference. For example, the coated glass substrate shown in FIG. 1 may be coupled to another glass substrate via spacer(s), sealant(s) or the like with a gap being defined therebetween in an IG window unit. In certain example instances, the coating may be provided on the side of the glass substrate S facing the gap, i.e., surface #2 or surface #3. In other example embodiments, the IG window unit may include additional glass sheets (e.g., the IG unit may include three spaced apart glass sheets instead of two).

Transparent dielectric lower contact layer 4 may be of or include zinc oxide (e.g., ZnO), zinc stannate, or other suitable material. The zinc oxide of layer 4 may contain other materials as well such as Al (e.g., to form ZnAlO$_x$) or Sn in certain example embodiments. For example, in certain example embodiments of this invention, zinc oxide layer 4 may be doped with from about 1 to 10% Al (or B), more preferably from about 1 to 5% Al (or B), and most preferably about 2 to 4% Al (or B). The use of zinc oxide 4 under the silver in layer 5 allows for an excellent quality of silver to be achieved. Zinc oxide layer 4 is typically deposited in a crystalline state. In certain example embodiments (e.g., to be discussed below) the zinc oxide inclusive layer 4 may be formed via sputtering a ceramic ZnO or metal rotatable magnetron sputtering target.

Infrared (IR) reflecting layer 5 is preferably substantially or entirely metallic and/or conductive, and may comprise or consist essentially of silver (Ag), gold, or any other suitable IR reflecting material. The silver of IR reflecting layer 5 may be doped with other material(s), such as with Pd, Zn, or Cu, in certain example embodiments. IR reflecting layer 5 helps allow the coating to have low-E and/or good solar control characteristics such as low emittance, low sheet resistance, and so forth. The IR reflecting layer may, however, be slightly oxidized in certain embodiments of this invention. Multiple silver based IR reflecting layers 5 may be provided, spaced apart in low-E coating by at least one dielectric layer, in double or triple silver stacks including high index layers discussed herein in certain example embodiments of this invention.

Upper contact layer 6 is located over and directly contacting the IR reflecting layer 5, and may be of or include an oxide of Ni and/or Cr in certain example embodiments. In certain example embodiments, upper contact layer 6 may be of or include nickel (Ni) oxide, chromium/chrome (Cr) oxide, or a nickel alloy oxide such as nickel chrome oxide (NiCrO$_x$), or other suitable material(s) such as NiCrMoO$_x$, NiCrMo, Ti, NiTiNbO$_x$, TiO$_x$, metallic NiCr, or the like. Contact layer 6 may or may not be oxidation graded in different embodiments of this invention. Oxidation grading means that the degree of oxidation in the layer changes through the thickness of the layer so that for example a contact layer may be graded so as to be less oxidized at the contact interface with the immediately adjacent IR reflecting layer 4 than at a portion of the contact layer further or more/most distant from the immediately adjacent IR reflecting layer. Contact layer 6 may or may not be continuous in different embodiments of this invention across the entire IR reflecting layer 4.

Other layer(s) below or above the illustrated FIG. 1 coating may also be provided. Thus, while the layer system or coating is "on" or "supported by" substrate S (directly or indirectly), other layer(s) may be provided therebetween. Thus, for example, the coating of FIG. 1 may be considered "on" and "supported by" the substrate S even if other layer(s) are provided between layer 1 and substrate S. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate S in the FIG. 1 embodiment may be as follows, from the glass substrate outwardly (e.g., the Al content in the zinc oxide and silicon nitride layers may be from about 1-10%, more preferably from about 1-5% in certain example instances). Thickness are in units of angstroms (Å).

TABLE 1

(Example Materials/Thicknesses; FIG. 1 Embodiment)

| Layer | Preferred Range (Å) | More Preferred (Å) | Example (Å) |
|---|---|---|---|
| Glass Substrate | | | |
| Si$_x$N$_y$ (layer 1) | 40-300 Å | 50-170 Å | 70-130 Å |
| ZrSiN or ZrSiAlN (layer 2) | 20-450 Å | 30-250 Å | 40-200 Å |
| TiO$_2$ (layer 3) | 20-300 Å | 40-180 Å | 40-120 Å |

TABLE 1-continued (Example Materials/Thicknesses; FIG. 1 Embodiment)

| Layer | Preferred Range (Å) | More Preferred (Å) | Example (Å) |
|---|---|---|---|
| ZnAlO (layer 4) | 30-250 Å | 40-180 Å | 40-100 Å |
| Ag (layer 5) | 40-160 Å | 65-125 Å | 110 Å |
| Contact (layer 6) | 10-70 Å | 20-45 Å | 25-35 Å |
| TiO$_2$ (layer 3) | 20-300 Å | 40-180 Å | 40-120 Å |
| ZrSiN or ZrSiAlN (layer 2) | 20-450 Å | 30-250 Å | 40-200 Å |
| Si$_x$N$_y$ (layer 1) | 50-400 Å | 100-300 Å | 140-240 Å |
| SiO$_2$ (layer 8) | 50-600 Å | 100-500 Å | 200-400 Å |

In certain example embodiments of this invention, coated articles herein (e.g., see FIG. 1) may have the following low-E (low emissivity), solar and/or optical characteristics set forth in Table 2 when measured monolithically.

TABLE 2

Low-E/Solar Characteristics (Monolithic)

| Characteristic | General | More Preferred | Most Preferred |
|---|---|---|---|
| R$_s$ (ohms/sq.): | <= 11.0 | <= 10 | <= 9 |
| E$_n$: | <= 0.2 | <= 0.15 | <= 0.10 |
| T$_{vis}$ (%): | >= 50 | >= 60 | >= 70 |
| SHGC (%): | >= 40 | >= 50 | >= 55 |

Examples 1-5 according to certain example embodiments of this invention, and two Comparative Examples (CEs), are discussed below with reference to FIG. 2.

FIG. 2 sets forth the layer stacks for Comparative Example 1 (CE 1), Comparative Example 2 (CE 2), and Examples 1-5. Layer thicknesses in FIG. 2 are in units of nm. For instance, CE 1 had a layer stack of: It can be seen in FIG. 2 that Examples 1-2 had the layer stack shown in FIG. 1, and Examples 3-5 had the layer stack shown in FIG. 1 except that the ZrSiN layer 2 in the upper dielectric stack was omitted. In contrast, FIG. 2 shows that CE 1 omitted the TiO$_2$ layer 3 in the bottom dielectric stack, and CE 2 omitted the ZrSiN layer 2 in the bottom dielectric stack. Thus, the upper dielectric stack of CE 1 was according to an embodiment of this invention with film 11, but the bottom dielectric stack of CE 1 was not. SHGC (solar heat gain coefficient) values are reported in the bottom row of FIG. 2, and dielectric deposition rates (DDR) are reported for the respective coated articles in the next to last row of FIG. 2. It can be seen that the deposition rates of Examples 1-5 were all substantially higher than that of CE 2, because part of the TiO$_2$ layer in the bottom dielectric stack of CE 2 was replaced with ZrSiN in Examples 1-5. However, it can be seen that CE 1 had a lower SHGC value than Examples 1-5 because the TiO$_2$ layer in the bottom dielectric stack was entirely omitted. Thus, it can be seen that the use of bi-layer high index dielectric film 11 made up of ZrSiN layer 2 and TiO$_2$ layer 3 in the bottom dielectric stack of Examples 1-5 was advantageous in that (a) it allowed for a better (higher) SHGC value than CE 1 (a higher SHGC value is desired in cold climate applications), and (b) it allowed for a much better/faster deposition rate, and thus lower cost of production, than CE 2. FIG. 2 demonstrates that the thicker the TiO$_2$ layer, the higher the SHGC value but the lower the sputter deposition rate and thus lower throughput during manufacturing. Accordingly, it can be seen that the use of bi-layer high index dielectric film 11 made up of ZrSiN layer 2 and TiO$_2$ layer 3 provides for a combination faster deposition rate relative to CE 2 and higher SHGC value relative to CE 1, and thus an overall improved product. Note that the use of bi-layer high index dielectric film 11 made up of ZrSiN layer 2 and TiO$_2$ layer 3 may be used in one or both of the bottom dielectric stack and/or top dielectric stack according to various embodiments of this invention.

In an example embodiment of this invention, there is provided a coated article including a coating supported by a glass substrate, the coating comprising: a first dielectric film on the glass substrate; an infrared (IR) reflecting layer on the glass substrate, located over at least the first dielectric film; a second dielectric film on the glass substrate, located over at least the IR reflecting layer; and wherein at least one of the first and second dielectric films comprises (a) a first high index dielectric layer comprising a nitride of Zr and Si, wherein the first high index dielectric layer contains more Zr than Si, and (b) a second high index dielectric layer comprising an oxide of titanium that directly contacts the first high index dielectric layer.

In the coated article of the immediately preceding paragraph, each of the first and second high index dielectric layers may have a refractive index (n) of at least 2.21 at 550 nm, more preferably of at least 2.25 at 550 nm.

In the coated article of any of the preceding two paragraphs, the first high index dielectric layer comprising the nitride of Zr and Si may further comprise Al.

In the coated article of any of the preceding three paragraphs, the first high index dielectric layer comprising the nitride of Zr and Si may have a metal content comprising from 30-80% Zr and from 3-25% Si (atomic %), more preferably from 35-75% Zr and from 3-15% Si (atomic %).

In the coated article of any of the preceding four paragraphs, the first high index dielectric layer comprising the nitride of Zr and Si may have a metal content comprising from 30-80% Zr, from 3-25% Si, and from 15-50% Al (atomic %), more preferably from 30-80% Zr, from 3-25% Si, and from 20-40% Al (atomic %).

In the coated article of any of the preceding five paragraphs, the first high index dielectric layer comprising the nitride of Zr and Si may further comprise Al and contain more Zr than each of Si and Al (atomic %).

In the coated article of any of the preceding six paragraphs, Zr may have the highest metal content (atomic %) of any metal in the first high index dielectric layer comprising the nitride of Zr and Si.

In the coated article of any of the preceding seven paragraphs, the first high index dielectric layer comprising the nitride of Zr and Si may further comprise Al, wherein Al may have the second highest metal content (atomic %) of any metal in the first high index dielectric layer.

In the coated article of any of the preceding eight paragraphs, the first high index dielectric layer comprising the nitride of Zr and Si may contains at least twice as much Zr as Si, more preferably at least four times as much Zr as Si.

In the coated article of any of the preceding nine paragraphs, the first high index dielectric layer comprising the nitride of Zr and Si may contain at least 1.4 times as much Zr as Al (atomic %).

In the coated article of any of the preceding ten paragraphs, the coating may be a low-E coating and have a normal emissivity (En) of no greater than 0.2, more preferably no greater than 0.10.

In the coated article of any of the preceding eleven paragraphs, the layer comprising the nitride of Zr and Si may be amorphous or substantially amorphous, and the layer comprising the oxide of titanium may be crystalline.

In the coated article of any of the preceding twelve paragraphs, the layer comprising the nitride of Zr and Si may contain from 0-10% oxygen, more preferably from 0-5% oxygen (atomic %).

In the coated article of any of the preceding thirteen paragraphs, each of the first and second dielectric films may comprise: (a) a first high index dielectric layer comprising a nitride of Zr and Si, wherein the first high index dielectric layer contains more Zr than Si, and (b) a second high index dielectric layer comprising an oxide of titanium that directly contacts the first high index dielectric layer. Layer (b) may be closer to the IR reflecting layer than is layer (a) in both of the first and second dielectric films.

In the coated article of any of the preceding fourteen paragraphs, the IR reflecting layer may comprises silver.

In the coated article of any of the preceding fifteen paragraphs, the coating may further comprises a layer comprising silicon nitride located between the glass substrate and the first dielectric film.

In the coated article of any of the preceding sixteen paragraphs, the coating may further comprise a layer comprising silicon nitride on the glass substrate and located over the second dielectric film.

In the coated article of any of the preceding seventeen paragraphs, the coating may further comprise a layer comprising zinc oxide located over the first dielectric film and under and directly contacting the IR reflecting layer.

In the coated article of any of the preceding eighteen paragraphs, the coating may further comprise a layer comprising Ni and/or Cr located over and directly contacting the IR reflecting layer.

In the coated article of any of the preceding nineteen paragraphs, the coating may further comprise an overcoat comprising silicon oxide.

In the coated article of any of the preceding twenty paragraphs, the coated article may be thermally tempered.

In the coated article of any of the preceding twenty one paragraphs, the coated article may have a visible transmission of at least 50%, more preferably of at least 60%, and most preferably of at least 70%.

In the coated article of any of the preceding twenty two paragraphs, each of the first and second dielectric films may consist essentially of two layers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
   a first dielectric film on the glass substrate;
   an infrared (IR) reflecting layer on the glass substrate, located over at least the first dielectric film;
   a second dielectric film on the glass substrate, located over at least the IR reflecting layer; and
   wherein at least one of the first and second dielectric films comprises (a) a first high index dielectric layer comprising a nitride of Zr and Si and further comprises Al, wherein the first high index dielectric layer contains more Zr than Si, and (b) a second high index dielectric layer comprising an oxide of titanium that directly contacts the first high index dielectric layer.

2. The coated article of claim 1, wherein each of the first and second high index dielectric layers has a refractive index (n) of at least 2.21 at 550 nm.

3. The coated article of claim 1, wherein each of the first and second high index dielectric layers has a refractive index (n) of at least 2.25 at 550 nm.

4. The coated article of claim 1, wherein the first high index dielectric layer comprising the nitride of Zr and Si has a metal content comprising from 30-80% Zr and from 3-25% Si (atomic %).

5. The coated article of claim 1, wherein the first high index dielectric layer comprising the nitride of Zr and Si has a metal content comprising from 35-75% Zr and from 3-15% Si (atomic %).

6. The coated article of claim 1, wherein the first high index dielectric layer comprising the nitride of Zr and Si has a metal content comprising from 30-80% Zr, from 3-25% Si, and from 15-50% Al (atomic %).

7. The coated article of claim 1, wherein the first high index dielectric layer comprising the nitride of Zr and Si has a metal content comprising from 30-80% Zr, from 3-25% Si, and from 20-40% Al (atomic %).

8. The coated article of claim 1, wherein the first high index dielectric layer comprising the nitride of Zr and Si, further comprises Al and contains more Zr than each of Si and Al (atomic %).

9. The coated article of claim 1, wherein Zr has the highest metal content (atomic %) of any metal in the first high index dielectric layer comprising the nitride of Zr and Si.

10. The coated article of claim 9, wherein the first high index dielectric layer comprising the nitride of Zr and Si further comprises Al, and wherein Al has the second highest metal content (atomic %) of any metal in the first high index dielectric layer.

11. The coated article of claim 1, wherein the first high index dielectric layer comprising the nitride of Zr and Si contains at least twice as much Zr as Si.

12. The coated article of claim 1, wherein the first high index dielectric layer comprising the nitride of Zr and Si contains at least four times as much Zr as Si.

13. The coated article of claim 1, wherein the first high index dielectric layer comprising the nitride of Zr and Si further comprises Al, and contains at least 1.4 times as much Zr as Al (atomic %).

14. The coated article of claim 1, wherein the coating is a low-E coating and has a normal emissivity ($E_n$) of no greater than 0.2.

15. The coated article of claim 1, wherein the coating is a low-E coating and has a normal emissivity ($E_n$) of no greater than 0.10.

16. The coated article of claim 1, wherein the layer comprising the nitride of Zr and Si is amorphous or substantially amorphous, and the layer comprising the oxide of titanium is crystalline.

17. The coated article of claim 1, wherein the layer comprising the nitride of Zr and Si contains from 0-10% oxygen (atomic %).

18. The coated article of claim 1, wherein each of the first and second dielectric films comprises: (a) a first high index dielectric layer comprising a nitride of Zr and Si, wherein the first high index dielectric layer contains more Zr than Si, and (b) a second high index dielectric layer comprising an oxide of titanium that directly contacts the first high index dielectric layer.

19. The coated article of claim 18, wherein layer (b) is closer to the IR reflecting layer than is layer (a) in both of the first and second dielectric films.

20. The coated article of claim 1, wherein the IR reflecting layer comprises silver.

21. The coated article of claim 1, wherein the coating further comprises a layer comprising silicon nitride located between the glass substrate and the first dielectric film.

22. The coated article of claim 1, wherein the coating further comprises a layer comprising silicon nitride on the glass substrate and located over the second dielectric film.

23. The coated article of claim 1, wherein the coating further comprises a layer comprising zinc oxide located over the first dielectric film and under and directly contacting the IR reflecting layer.

24. The coated article of claim 1, wherein the coating further comprises a layer comprising Ni and/or Cr located over and directly contacting the IR reflecting layer.

25. The coated article of claim 1, wherein the coating further comprises an overcoat comprising silicon oxide.

26. The coated article of claim 1, wherein the coated article is thermally tempered.

27. The coated article of claim 1, wherein the coated article has a visible transmission of at least 50%.

28. The coated article of claim 1, wherein each of the first and second dielectric films consists essentially of two layers.

* * * * *